United States Patent
Lin et al.

(10) Patent No.: US 11,360,912 B2
(45) Date of Patent: *Jun. 14, 2022

(54) METHOD FOR PERFORMING ADAPTIVE LOCKING RANGE MANAGEMENT, ASSOCIATED DATA STORAGE DEVICE AND CONTROLLER THEREOF

(71) Applicant: Silicon Motion, Inc., Hsinchu County (TW)

(72) Inventors: Chih-Yu Lin, Hsinchu County (TW); Hung-Ting Pan, Taoyuan (TW); Sung-Ling Hsu, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,206

(22) Filed: Nov. 30, 2020

(65) Prior Publication Data

US 2021/0103529 A1 Apr. 8, 2021

Related U.S. Application Data

(63) Continuation of application No. 16/503,591, filed on Jul. 4, 2019, now Pat. No. 10,884,954.

(30) Foreign Application Priority Data

Mar. 18, 2019 (TW) .................................. 108109171

(51) Int. Cl.
*G06F 12/00* (2006.01)
*G06F 12/14* (2006.01)
(Continued)

(52) U.S. Cl.
CPC ........ *G06F 12/1466* (2013.01); *G06F 3/0622* (2013.01); *G06F 3/0658* (2013.01);
(Continued)

(58) Field of Classification Search
CPC .. G06F 12/1466; G06F 3/0622; G06F 3/0658; G06F 3/0659; G06F 3/0679;
(Continued)

(56) References Cited

U.S. PATENT DOCUMENTS 6,141,728 A 10/2000 Simionescu
7,436,858 B2 10/2008 Goren
(Continued)

FOREIGN PATENT DOCUMENTS

CN 106462510 A 2/2017
CN 107481762 A 12/2017
(Continued)

OTHER PUBLICATIONS

Huang, Weipei; "Research on the Technology Applied in Key Module of eMMC Controller", A Dissertation Submitted for the Degree of Master, South China University of Technology, Guangzhou, China, Mar. 2016.

*Primary Examiner* — Mardochee Chery
(74) *Attorney, Agent, or Firm* — Winston Hsu

(57) ABSTRACT

A method for performing adaptive locking range management, an associated data storage device and a controller thereof are provided. The method may include: receiving a security command from outside of the data storage device, wherein the security command is related to changing an old locking range into a new locking range; obtaining a start Logical Block Address (LBA) and a length value of the new locking range according to the security command; determining whether the start LBA of the new locking range is less than an end LBA of the old locking range, and determining (Continued)

whether an end LBA of the new locking range is greater than a start LBA of the old locking range; and in response to both determination results being true, performing data trimming on any respective non-overlapped portions of the new locking range and the old locking range.

20 Claims, 5 Drawing Sheets

Related U.S. Application Data

(60) Provisional application No. 62/731,993, filed on Sep. 17, 2018.

(51) Int. Cl.
*G06F 12/06* (2006.01)
*G06F 21/62* (2013.01)
*G06F 3/06* (2006.01)

(52) U.S. Cl.
CPC .......... *G06F 3/0659* (2013.01); *G06F 3/0679* (2013.01); *G06F 12/06* (2013.01); *G06F 21/62* (2013.01)

(58) Field of Classification Search
CPC .. G06F 12/06; G06F 21/62; G06F 2212/7202; G06F 3/0637; G06F 12/0246; G06F 12/1441; G06F 21/80; G06F 3/0604
USPC ........................................................ 711/164
See application file for complete search history.

(56) References Cited

U.S. PATENT DOCUMENTS

| | | | |
|---|---|---|---|
| 7,587,558 B1 | 9/2009 | Smith | |
| 8,918,651 B2* | 12/2014 | Greco | G06F 21/80 713/189 |
| 8,949,512 B2* | 2/2015 | Vogan | G06F 12/0246 711/103 |
| 9,448,919 B1 | 9/2016 | Boyle | |
| 9,703,699 B2 | 7/2017 | Ehrlich | |
| 10,025,534 B1 | 7/2018 | Naing | |
| 10,481,837 B2* | 11/2019 | Lin | G06F 13/1694 |
| 10,719,457 B2* | 7/2020 | Sato | G06F 12/1458 |
| 2002/0161984 A1 | 10/2002 | Lloyd-Jones | |
| 2004/0226021 A1 | 11/2004 | Miki | |
| 2006/0212674 A1 | 9/2006 | Chung | |
| 2007/0070690 A1 | 3/2007 | Scheuerlein | |
| 2008/0025069 A1 | 1/2008 | Scheuerlein | |
| 2008/0025118 A1 | 1/2008 | Scheuerlein | |
| 2008/0104361 A1 | 5/2008 | Ippongi | |
| 2011/0145306 A1 | 6/2011 | Boyd | |
| 2012/0059978 A1 | 3/2012 | Rosenband | |
| 2012/0173832 A1 | 7/2012 | Post | |
| 2013/0173931 A1 | 7/2013 | Tzafrir | |
| 2013/0275660 A1 | 10/2013 | Bennett | |
| 2014/0164857 A1 | 6/2014 | Finch | |
| 2014/0304487 A1 | 10/2014 | Hayasaka | |
| 2016/0034186 A1 | 2/2016 | Weiner | |
| 2016/0092352 A1 | 3/2016 | Camp | |
| 2016/0299715 A1 | 10/2016 | Hashimoto | |
| 2017/0091123 A1* | 3/2017 | Sato | G06F 12/1441 |
| 2017/0177469 A1 | 6/2017 | Hashimoto | |
| 2017/0293553 A1 | 10/2017 | Heller | |
| 2018/0107400 A1 | 4/2018 | Tsai | |
| 2018/0210653 A1 | 7/2018 | Parthasarathy | |
| 2018/0210832 A1 | 7/2018 | Tang | |

FOREIGN PATENT DOCUMENTS

| | | |
|---|---|---|
| CN | 107632942 A | 1/2018 |
| CN | 108073522 A | 5/2018 |
| CN | 108475232 A | 8/2018 |
| TW | I430090 B | 3/2014 |
| TW | 201527973 A | 7/2015 |
| TW | 201740265 A | 11/2017 |
| TW | I619017 B | 3/2018 |
| TW | 201833777 A | 9/2018 |
| TW | I634424 B | 9/2018 |

* cited by examiner

METHOD FOR PERFORMING ADAPTIVE LOCKING RANGE MANAGEMENT, ASSOCIATED DATA STORAGE DEVICE AND CONTROLLER THEREOF

CROSS REFERENCE TO RELATED APPLICATIONS

This application is a continuation application and claims the benefit of U.S. Non-provisional application Ser. No. 16/503,591, which was filed on Jul. 4, 2019, and is included herein by reference. In addition, the U.S. Non-provisional application Ser. No. 16/503,591 claims the benefit of U.S. Provisional Application No. 62/731,993, which was filed on Sep. 17, 2018. Additionally, the U.S. Non-provisional application Ser. No. 16/503,591 further claims the benefit of Foreign Application TW108109171, now patent TW I684865, which was filed on Mar. 18, 2019.

BACKGROUND OF THE INVENTION

1. Field of the Invention

The present invention is related to flash memory access, and more particularly, to a method for performing adaptive locking range management, an associated data storage device and a controller thereof.

2. Description of the Prior Art

Developments in flash memory technology have led to the wide application of portable or non-portable data storage devices. Examples include memory cards conforming to SD/MMC, CF, MS, XD or UFS specifications, solid-state drives, and embedded storage devices conforming to UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually configured to have management mechanisms to properly manage internal operations thereof.

Related art data storage devices with the above management mechanisms still have some disadvantages. For example, when a manufacturer tries to implement a data storage device conforming to some specifications related to data encryption, related operations might need to be modified, which may cause some portions of the above mechanisms to become more complicated, and overall performance of the data storage device might be degraded. Thus, there is a need for a novel method and associated architecture in order to implement data storage devices with reliable management mechanisms without introducing any side effect or in a way that is less likely to introduce side effects.

SUMMARY OF THE INVENTION

An objective of the present invention is to provide a method for performing adaptive locking range management, an associated data storage device and a controller thereof, to solve the aforementioned problems.

Another objective of the present invention is to provide a method for performing adaptive locking range management, an associated data storage device and a controller thereof, to apply a reliable management mechanism to the data storage device without introducing any side effect or in a way that is less likely to introduce side effects.

At least one embodiment of the present invention provides a method for performing adaptive locking range management, wherein the method is applicable to a data storage device, the data storage device comprises a non-volatile (NV) memory, and the NV memory comprises at least one NV memory element. The method may comprise: receiving a security command from outside of the data storage device, wherein the security command is related to changing an old locking range into a new locking range; obtaining a start Logical Block Address (LBA) and a length value of the new locking range according to the security command, wherein an end LBA of the new locking range is a sum of the start LBA and the length value of the new locking range; determining whether the start LBA of the new locking range is less than an end LBA of the old locking range, and determining whether the end LBA of the new locking range is greater than a start LBA of the old locking range; and in response to the start LBA of the new locking range being less than the end LBA of the old locking range and the end LBA of the new locking range being greater than the start LBA of the old locking range, performing data trimming on any respective non-overlapped portions of the new locking range and the old locking range.

At least one embodiment of the present invention provides a data storage device, which may comprise: an NV memory, configured to store information, wherein the NV memory comprises at least one NV memory element; and a controller, coupled to the NV memory, configured to control operations of the data storage device. The controller may comprises a processing circuit, and the processing circuit may control the controller according to a plurality of host commands from a host device, to allow the host device to access the NV memory through the controller. For example: the controller receives a security command from the host device, wherein the security command is related to changing an old locking range into a new locking range; the controller obtains a start Logical Block Address (LBA) and a length value of the new locking range according to the security command, wherein an end LBA of the new locking range is a sum of the start LBA and the length value of the new locking range; the controller determines whether the start LBA of the new locking range is less than an end LBA of the old locking range, and determines whether the end LBA of the new locking range is greater than a start LBA of the old locking range; and in response to the start LBA of the new locking range being less than the end LBA of the old locking range and the end LBA of the new locking range being greater than the start LBA of the old locking range, the controller performs data trimming on any respective non-overlapped portions of the new locking range and the old locking range.

At least one embodiment of the present invention provides a controller of a data storage device, wherein the data storage device comprises the controller and an NV memory, and the NV memory comprises at least one NV memory element. The controller may comprise a processing circuit, and the processing circuit may control the controller according to a plurality of host commands from a host device, to allow the host device to access the NV memory through the controller. For example, the controller receives a security command from the host device, wherein the security command is related to changing an old locking range into a new locking range; the controller obtains a start Logical Block Address (LBA) and a length value of the new locking range according to the security command, wherein an end LBA of the new locking range is a sum of the start LBA and the length value of the new locking range; the controller determines whether the start LBA of the new locking range is less than an end LBA of the old locking range, and determines whether the end LBA of the new locking range is greater than a start LBA of the old locking range; and in response to the start LBA of the new locking range being less than the end LBA of the old locking range and the end LBA of the new locking range being greater than the start LBA of the old locking range, the controller performs data trimming on any respective non-overlapped portions of the new locking range and the old locking range.

The present invention can properly control operations of the controller through a carefully designed management mechanism; more particularly, the present invention can implement data encryption architecture conforming to certain specifications without degrading overall performance. In addition, implementing the embodiments of the present invention will not greatly increase additional costs, while solving problems of the related art. In comparison with conventional architectures, the present invention can achieve an optimal performance of the data storage device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
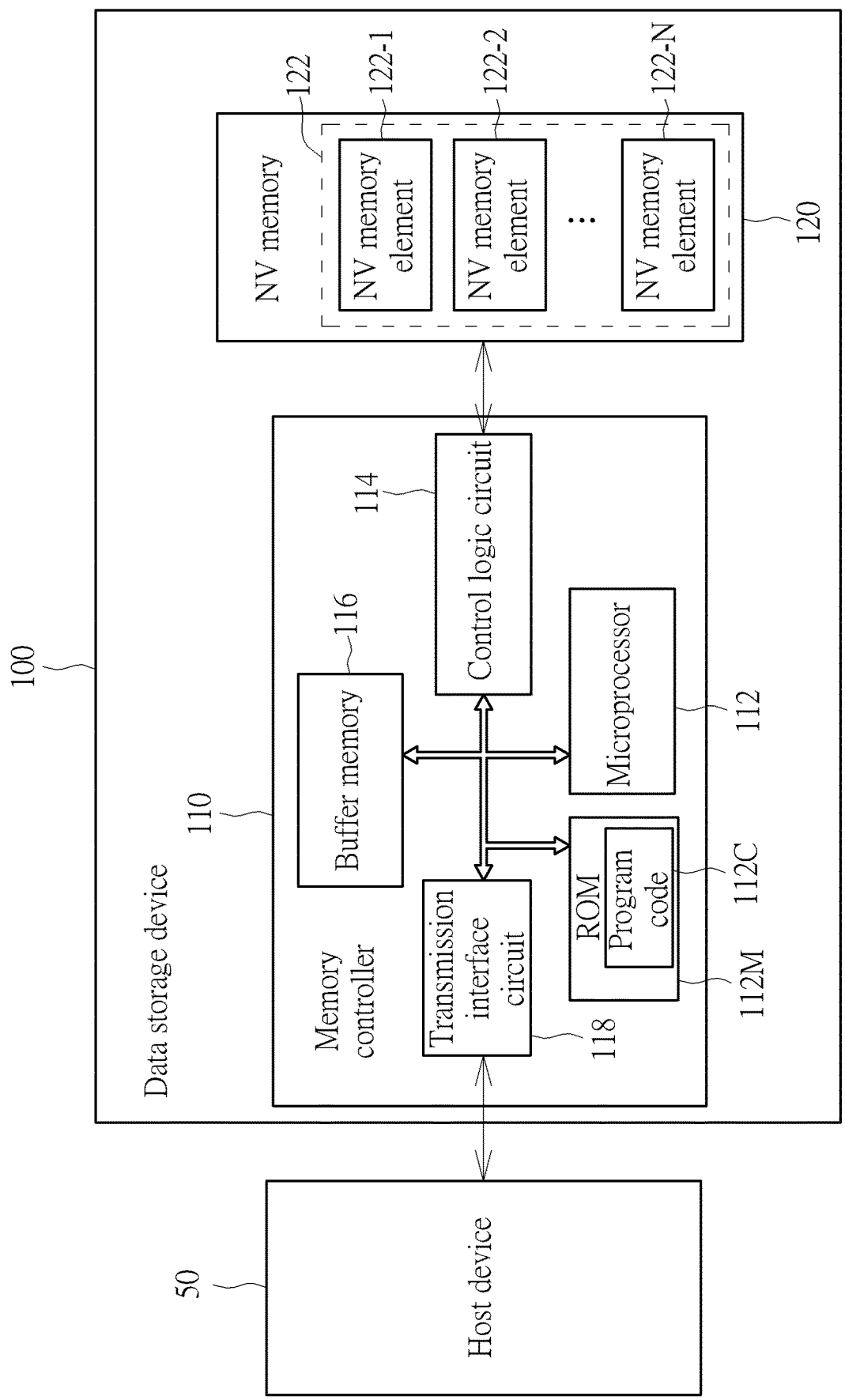
FIG. 1 is a diagram illustrating a data storage device and a host device according to a first embodiment of the present invention.

FIG. 1 is a diagram illustrating a data storage device 100 and a host device 50 according to a first embodiment of the present invention. The data storage device 100 may be a solid state drive (SSD). In addition, examples of the host device 50 may include, but are not limited to: a multifunctional mobile phone, a tablet, and a personal computer such as a desktop computer and a laptop computer. According to this embodiment, the data storage device 100 may comprise a controller such as a memory controller 110, and may further comprise a non-volatile (NV) memory 120, where the controller is configured to access the NV memory 120, and the NV memory 120 is configured to store information. The NV memory 120 may comprise a plurality of NV memory elements 122-1, 122-2, ... and 122-N, where the symbol "N" is a positive integer greater than one. For example, the NV memory 120 may be a flash memory, and the NV memory elements 122-1, 122-2, ... and 122-N may be a plurality of flash memory chips or a plurality of flash memory dies, but the present invention is not limited thereto. In addition, the data storage device 100 may further comprise a volatile memory element to buffer or cache data, where the volatile memory element is preferably a dynamic random access memory (DRAM). The volatile memory element may provide appropriate temporary storage space for buffering or caching data, or merely provide a small amount of temporary storage space for buffering or a small amount of caching data.

The memory controller 110 may comprise a processing circuit such as a microprocessor 112, a storage device such as a read only memory (ROM) 112M, a control logic circuit 114, a buffer memory 116, and a transmission interface circuit 118, where these components may be coupled to each other through a bus. The buffer memory 116 is preferably a static random access memory (SRAM). If the data storage device 100 further configures a dynamic RAM (DRAM), the memory controller 110 may take the buffer memory 116 as a first layer of cache, and take the DRAM as a second layer of cache. A data storage amount of the DRAM is preferably greater than a data storage amount of the buffer memory 116, and data buffered or cached in the DRAM may be from the buffer memory 116 or the NV memory 120.

The ROM 112M in this embodiment is configured to store a program code 112C, and the microprocessor 112 is configured to execute the program code 112C to control access of the NV memory 120. Please note that the program code 112C may also be stored in the buffer memory 116 or any type of memory. Additionally, the control logic circuit 114 may comprise an error correction code (ECC) circuit, in order to protect data and/or perform error correction. The transmission circuit 118 may conform to a specific communications specification (such as the Serial Advanced Technology Attachment (SATA) specification, the Peripheral Component Interconnect Express (PCIE) specification or the Non-Volatile Memory Express (NVME) specification) and may perform communications according to the specific communications specification.

In this embodiment, the host device 50 may transmit a plurality of host commands to the memory controller 110 in order to access (e.g. read or write) data in the NV memory 120 through the memory controller 110, and more specifically, access data (also referred to as user data) stored in the NV memory 120 within the data storage device 100, where the host commands comprise logical addresses, e.g. logical block addresses (LBAs). The memory controller 110 receives the host commands and translates the host commands into memory operating commands (which may be referred to as operating commands for brevity), and further controls the NV memory 120 to read and write/program page(s) of specific physical addresses within the NV memory 120 via the operating command. The memory controller 110 records relationships between logical addresses and physical addresses of data in a logical-to-physical (L2P) address mapping table (referred to as an L2P table for brevity), where any of the physical addresses (e.g. each of the physical address) may be constituted by a channel number, a logical unit number (LUN), a plane number, a block number, a page number and an offset. In some embodiments, the implementation of the physical addresses may vary. For example, any of the physical addresses (e.g. each of the physical address) may comprise a channel number, an LUN, a plane number, a block number, a page number and/or an offset.

The L2P table may be stored in a management table within the NV memory 120, and may be divided into a plurality of groups. The memory controller 110 may load one or all of the groups from the NV memory 120 into the buffer memory 116 according to a capacity of the buffer memory 116, thereby creating a temporary L2P table for quick reference, but the present invention is not limited thereto. When updating the user data, the memory controller 110 may update the temporary L2P table and/or the L2P table within the management table according to the latest mapping relationship(s) of the user data. A size of one group of the groups of the L2P table is preferably equal to a size of one page of an NV memory element 122-n (e.g. 16 KB), where the symbol "n" may represent any integer within an interval [1, N]. In another example, the size of one group of the groups of the L2P table 120T may be equal to a size of one page of multiple NV memory elements 122, e.g. in a situation where N=4, a size of one page of four NV memory elements 122 may be equal 64 KB, and the page of these four NV memory elements 122 may be referred to as a super page.

Regarding the host device 50, available storage space within the data storage device 100 may be accessed through a series of LBAs. For better comprehension, assume that the host device 50 writes the data storage device to be full of data. Under this situation, each set of data has a unique LBA. For example, the series of LBAs may comprise a predetermined number of LBAs, and values of these LBAs fall in a range from LBA #0 to LBA #Max, where Max is a positive integer. The range from LBA #0 to LBA #Max may be referred to as a global range. The host device 50 may set categories of access authorization of the global range, e.g. Normal, Read-Locked, Write-Locked, etc. In addition, the values of the LBAs may be continuous or discontinuous, and a starting value of the LBAs may be 0 or any integer.

Figure 2:
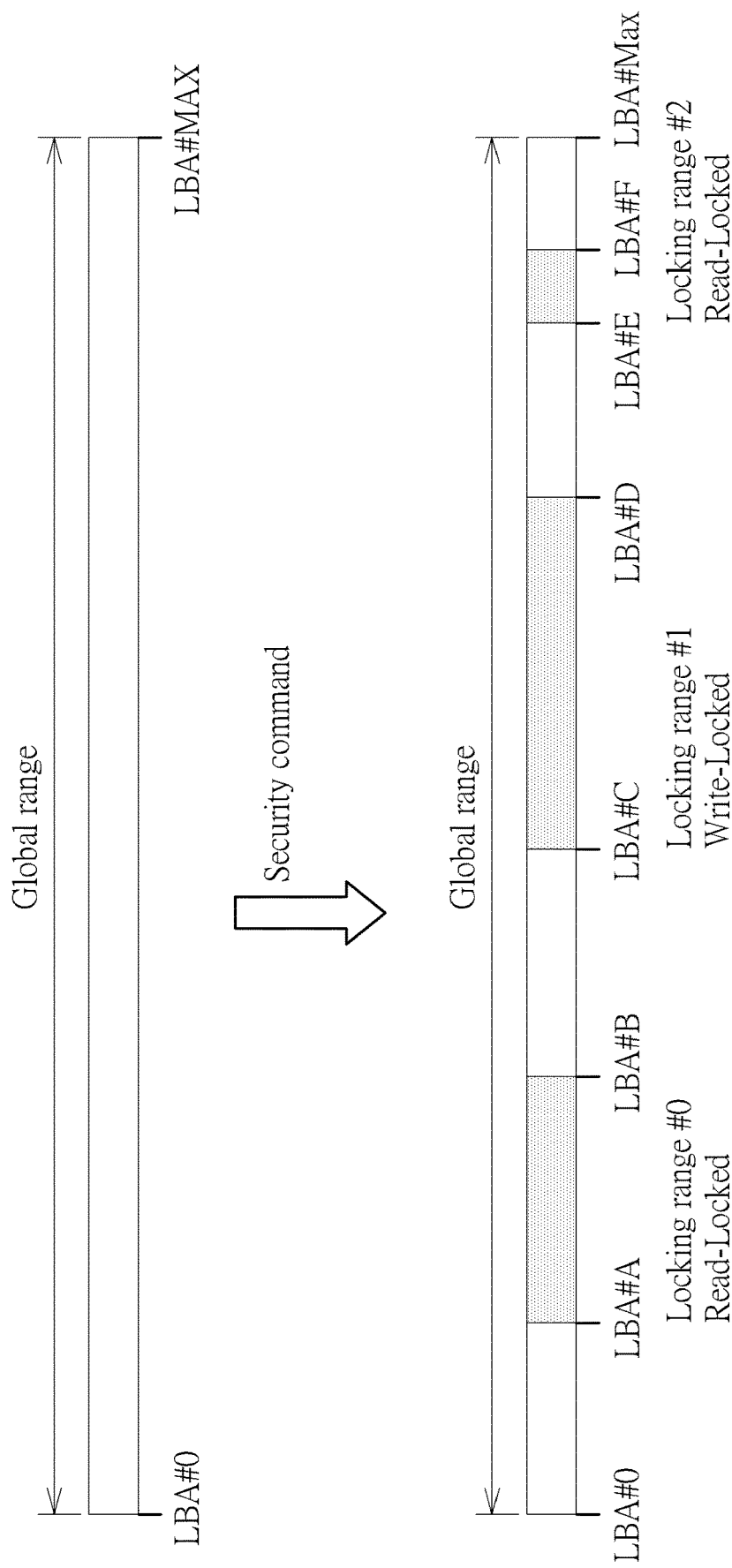
FIG. 2 illustrates examples of a global range and a plurality of locking ranges.

Data may comprise accessible data and limited access data. Regarding the limited access data, the host device 50 may establish one or more locking ranges in the global range and set categories of access authorization of the one or more locking ranges, e.g. Normal, Read-Locked, Write-Locked, etc. For example, the one or more locking range may comprise a plurality of locking ranges such as a locking range #0, a locking range #1 and a locking range #2 shown in FIG. 2. Afterwards, the host device 50 may set the access authorization of the user regarding the limited access data according to user related information (such as user identification, user group(s), etc.).

Regarding data of the locking ranges, the host device 50 preferably commands the data storage device 100 to use a key to encrypt data into ciphertext(s), or uses the key to directly encrypt data into ciphertext (s) and further stores the ciphertext (s) into the data storage device 100. Assuming that the access authorization of the global range is Normal, data of the locking range #0 is encrypted by a key #0, and the access authorization is Read-Locked. When a user without authorization is going to read the data of the locking range #0 by the host device 50, the data storage device 100 will return a response message (such as that indicating a data access error or data protection) to the host device 50. Data of the locking range #1 is preferably encrypted by a key #1, or still encrypted by the key #0, and the access authorization is Write-Locked. When a user without authorization is going to update or write the data of the locking range #1 by the host device 50, the data storage device 100 will return a response message (such as that indicating a data access error or data protection) to the host device 50. In addition, the key #0 and the key #1 are preferably encrypted into ciphertext(s) by a key #2 in order to protect the key #0 and the key #1. In addition, encryption and decryption are preferably executed by the memory controller 110 of the data storage device 100.

The host device 50 may output a security command or a trusted command to the data storage device 100 (more particularly, the memory controller 110) to modify or set a locking range. When the locking range is changed, data that is not in the (new) locking range has to undergo data trimming in order to protect confidentiality of data within the old locking range, and data within the new locking range also needs to undergo data trimming. Since the locking range may affect data access authorization of the user, how to quickly make the new locking range effective after modification or setting and quickly finish data trimming has become an important issue in the art.

Figure 3:
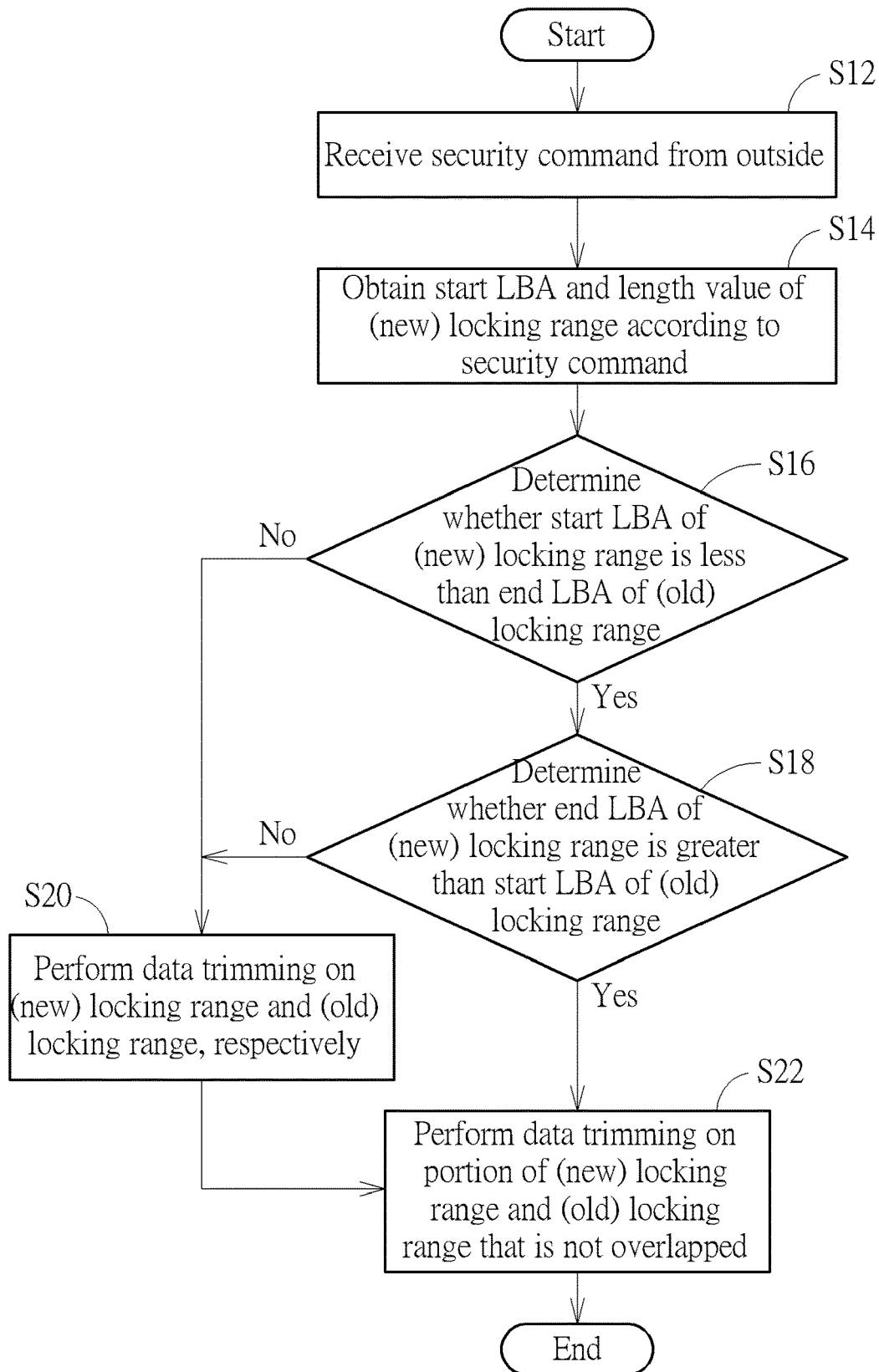
FIG. 3 is a working flow illustrating a method for performing adaptive locking range management according to an embodiment of the present invention.

At least one embodiment of the present invention discloses a method for performing adaptive locking range management. The method is applicable to the data storage device 100 and executed by the memory controller 110 of the data storage device 100. The method can quickly make the new locking range effective, e.g. by a working flow having high efficiency as shown in FIG. 3. For brevity of illustration, assume that the access authorization of the global range is Normal, and the data storage device 100 already has the (old) locking ranges #0 to #2. For example: the (old) locking range #0 has a start LBA such as an LBA #A and has an end LBA such as an LBA #B, where the access authorization thereof is Read-Locked; the (old) locking range #1 has a start LBA such as an LBA #C and has an end LBA such as an LBA #D, where the access authorization thereof is Write-Locked; and the (old) locking range #2 has a start LBA such as an LBA #E and has an end LBA such as an LBA #F, where the access authorization thereof is Read-Locked.

In Step S12, the memory controller 110 receives a security command from outside. According to this embodiment, the memory controller 110 may receive a plurality of security commands (such as the security commands transmitted by the host device 50) from outside of the data storage device 100, and the working flow shown in FIG. 3 may be executed many times to perform corresponding operations regarding the plurality of security commands, respectively, wherein these security commands may indicate that the host device requests the memory controller 110 to update or change corresponding locking ranges within the plurality of locking ranges. The aforementioned corresponding locking ranges may comprise the locking range #0, the locking range #1 and the locking range #2 shown in FIG. 2. The memory controller 110 may change the locking range #0, the locking range #1 and the locking range #2 according to these security commands, and more particularly, change the respective original versions or old versions (labeled "Old" in FIG. 4) of the locking range #0, the locking range #1 and the locking range #2 into respective new versions (labeled "New" in FIG. 4) of the locking range #0, the locking range #1 and the locking range #2.

Figure 4:
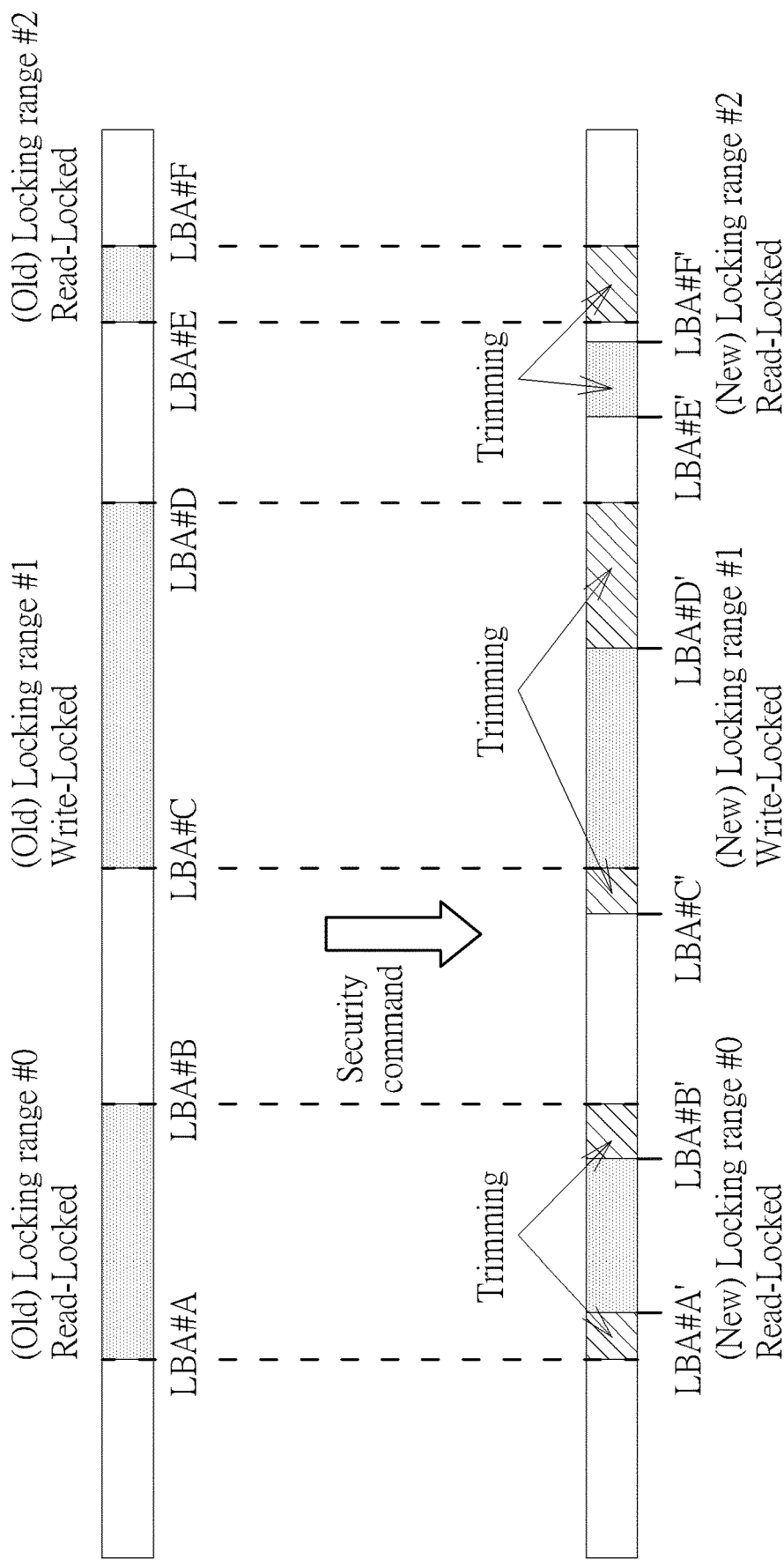
FIG. 4 illustrates a locking range update scheme of the method according to an embodiment of the present invention.

In Step S14, the memory controller 110 obtains a locking range number, a start LBA and a length value of the (new) locking range according to the security command, and the security commands may comprise the access authorization of the (new) locking range. For example, in the plurality of security commands, a first security command indicates: regarding the (new) locking range #0, the start LBA is LBA #A' and the end LBA is LBA #B', and the access authorization is Read-Locked. A second security command indicates: regarding the (new) locking range #1, the start LBA is LBA #C' and the end LBA is LBA #D % and the access authorization is Write-Locked. A third security command indicates: regarding the (new) locking range #2, the start LBA is LBA #E' and the end LBA is LBA #F', and the access authorization is Read-Locked as shown in FIG. 4. Regarding any locking range within these locking ranges, the memory controller 110 may determine the end LBA thereof according to the start LBA and the length value thereof, wherein the value of the end LBA is the value of the start LBA plus the length value. The memory controller 110 may utilize a sum of the start LBA and the length value to be the end LBA.

In Step S16, the memory controller 110 determines whether the start LBA of the (new) locking range is less than the end LBA of the (old) locking range. If yes (i.e. a determination result is "True"), Step S18 is executed; if no (i.e. the determination result is "False"), Step S20 is executed. When determining the (new) locking range #0, since the LBA #A' is less than the LBA #B, Step S18 is executed; when determining the (new) locking range #1, since the LBA #C' is less than the LBA #D, Step S18 is executed; when determining the (new) locking range #2, since the LBA #E' is less than the LBA #F, Step S18 is executed.

In Step S18, the memory controller 110 determines whether the end LBA of the (new) locking range is greater than the start LBA of the (old) locking range. If yes (i.e. a determination result is "True"), Step S22 is executed; if no (i.e. the determination result is "False"), Step S20 is executed. When determining the (new) locking range #0, since the LBA #B' is greater than the LBA #A, which means the (old) locking range #0 and the (new) locking range #0 have partial locking ranges that are overlapped, Step S22 is executed; when determining the (new) locking range #1, since the LBA #D' is greater than the LBA #C, which means the (old) locking range #1 and the (new) locking range #1 have partial locking ranges that are overlapped, Step S22 is executed; when determining the (new) locking range #2, since the LBA #F' is less than the LBA #E, which means the (old) locking range #2 and the (new) locking range #2 are not overlapped at all, Step S20 is executed.

In Step S20, the memory controller 110 performs data trimming on the (new) locking range and the (old) locking range, respectively. Taking the locking range #2 as an example, since the (new) locking range #2 and the (old) locking range #2 are not overlapped at all, the memory controller 110 performs data trimming on the (new) locking range #2 (i.e. the LBA #E' to the LBA #F') and the (old) locking range #2 (i.e. the LBA #E to the LBA #F), respectively.

In Step S22, the memory controller 110 performs data trimming on a portion (e.g. any portion) of the (new) locking range and the (old) locking range that is not overlapped, where the aforementioned portion that is not overlapped comprises any portion of the (new) locking range that is not overlapped by the (old) locking range and any portion of the (old) locking range that is not overlapped by the (new) locking range. Taking the locking range #0 as an example, the portion that is not overlapped is the LBA #A to the LBA #A' and the LBA #B' to the LBA #B, where, since a value of the LBA #A is less than that of the LBA #A' and a value of the LBA #B' is less than that of the LBA #B, the memory controller 110 performs data trimming on the LBA #A to the LBA #A' and the LBA #B' to the LBA #B, respectively. Taking the locking range #1 as an example, the portion that is not overlapped is the LBA #C' to the LBA #C and the LBA #D' to the LBA #D, where, since a value of the LBA #C' is less than that of the LBA #C and a value of the LBA #D' is less than that of the LBA #D, the memory controller 110 performs data trimming on the LBA #C' to the LBA #C and the LBA #D' to the LBA #D, respectively.

For better comprehension, the method may be illustrated by the working flow shown in FIG. 3, but the present invention is not limited thereto. According to some embodiments, one or more steps may be added, removed or modified in the working flow shown in FIG. 3. For example, regarding Step S16 and Step S18, if the determination result is "False", Step S20 is executed, which means: in the working flow shown in FIG. 3, the order of executing Step S16 and Step S18 may be exchanged without affecting correctness of Step S20 or Step S22. According to an embodiment, this modification may be applied. More particularly, after Step S14 is executed, Step S18 is executed; if the determination result of Step S18 is "True", Step S16 is executed; if the determination result of Step S18 is "False", Step S20 is executed; if the determination result of Step S16 is "True", Step S22 is executed; if the determination result of Step S16 is "False", Step S20 is executed. For brevity, similar descriptions for this embodiment are not repeated in detail here.

Figure 5:
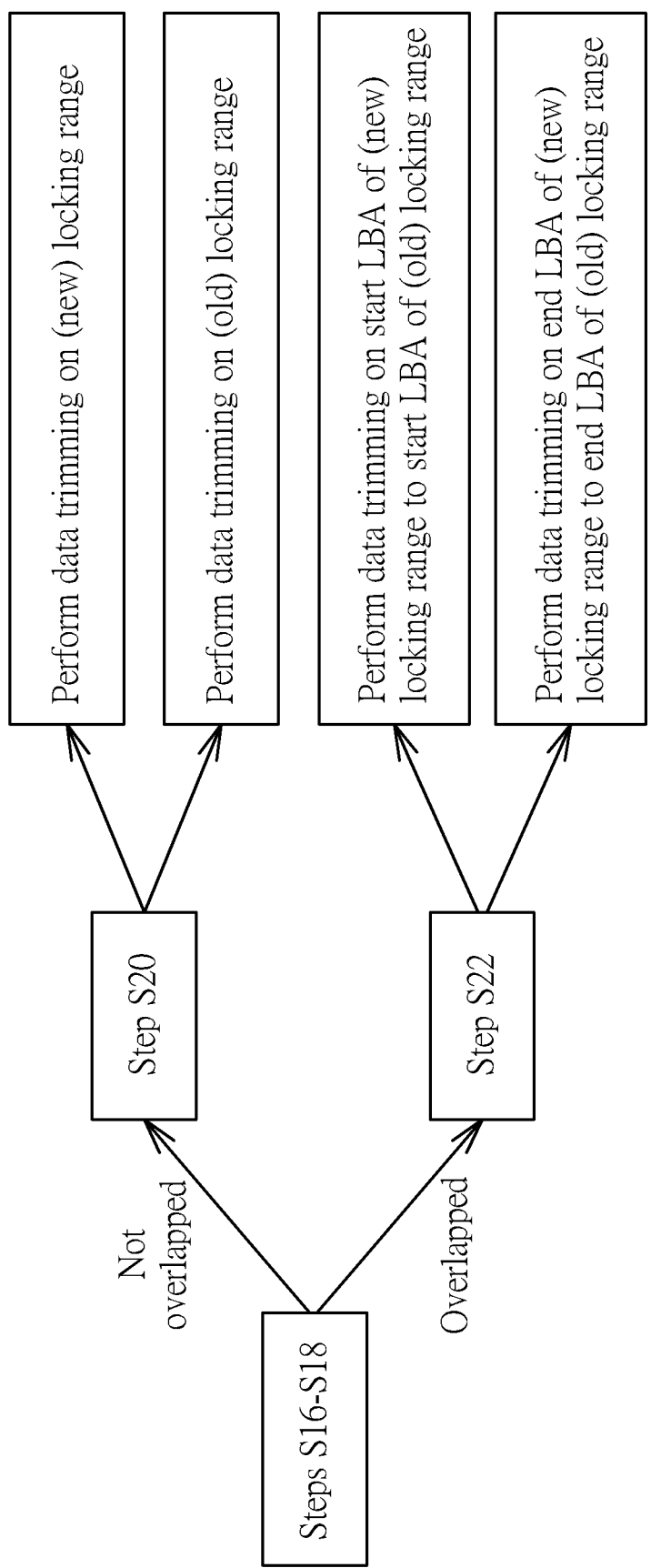
FIG. 5 is a diagram illustrating a method for performing adaptive locking range management according to an embodiment of the present invention.

FIG. 5 is a diagram illustrating a method for performing adaptive locking range management according to an embodiment of the present invention. FIG. 5 may be regarded as a simplified version of FIG. 3, and may illustrate advantages of the method for performing adaptive locking range management of the present invention. First, the memory controller 110 may determine whether the (new) locking range and the (old) locking range are overlapped as shown in Steps S16 to S18. If the determination result indicates they are not overlapped, the memory controller 110 may perform data trimming on the (new) locking range and the (old) locking range, respectively, as shown in Step S20. If the determination result indicates they are overlapped, the memory controller 110 may perform data trimming on the portion(s) that are not overlapped only, as shown in Step S22. Since the method for performing adaptive locking range management of the present invention can be executed with ease, the change of locking ranges can be quickly performed and become effective to achieve the purposes of the present invention.

When the host device 50 sets locking ranges, if the locking ranges having different locking range numbers are overlapped, the memory controller 110 will directly return a response message such as that indicating an invalid command to the host device 50 so that data trimming will not be executed. If the locking ranges having different access authorizations (e.g. different access authorization settings) are overlapped, the memory controller 110 will also directly return a response message such as that indicating an invalid command to the host device 50.

After the host device 50 outputs security commands and the memory controller 110 finishes the method for performing adaptive locking range management of the present invention, the update of locking ranges is finished. Afterwards, the host device 50 may output host commands to access data of the data storage device 100. If an LBA of data to be accessed is not in a locking range, the data storage device 100 may return the data to the host device 50; if an LBA of data to be accessed is in any locking range, the data storage device 100 may return a response message (such as that indicating a data access error or data protection) to the host device 50.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing adaptive locking range management, the method being applicable to a data storage device, the data storage device comprising a non-volatile (NV) memory, the NV memory comprising at least one NV memory element, the method comprising:
   in response to a request of changing an old locking range into a new locking range, determining whether a start Logical Block Address (LBA) of the new locking range is less than an end LBA of the old locking range, and determining whether an end LBA of the new locking range is greater than a start LBA of the old locking range; and
   in response to the start LBA of the new locking range being less than the end LBA of the old locking range and the end LBA of the new locking range being greater than the start LBA of the old locking range, performing data trimming on any respective non-overlapped portions of the new locking range and the old locking range.

2. The method of claim 1, further comprising:
   in response to a request of changing another old locking range into another new locking range, determining whether a start LBA of the another new locking range is less than an end LBA of the another old locking range;
   in response to the start LBA of the another new locking range being less than the end LBA of the another old locking range, determining whether an end LBA of the another new locking range is greater than a start LBA of the another old locking range; and
   in response to the end LBA of the another new locking range being not greater than the start LBA of the another old locking range, performing data trimming on the another new locking range and the another old locking range, respectively.

3. The method of claim 2, further comprising:
   in response to a request of changing yet another old locking range into yet another new locking range, determining whether a start LBA of the yet another new locking range is less than an end LBA of the yet another old locking range; and
   in response to the start LBA of the yet another new locking range being not less than the end LBA of the yet another old locking range, performing data trimming on the yet another new locking range and the yet another old locking range, respectively.

4. The method of claim 3, wherein the old locking range and the new locking range have partial locking ranges that are overlapped, the another new locking range and the another old locking range are not overlapped at all, and the yet another new locking range and the yet another old locking range are not overlapped at all.

5. The method of claim 2, wherein the old locking range and the new locking range have partial locking ranges that are overlapped, and the another new locking range and the another old locking range are not overlapped at all.

6. The method of claim 1, wherein the old locking range and the new locking range have partial locking ranges that are overlapped.

7. The method of claim 1, further comprising:
   in response to a request of changing another old locking range into another new locking range, determining whether a start LBA of the another new locking range is less than an end LBA of the another old locking range; and
   in response to the start LBA of the another new locking range being not less than the end LBA of the another old locking range, performing data trimming on the another new locking range and the another old locking range, respectively.

8. The method of claim 7, wherein the old locking range and the new locking range have partial locking ranges that are overlapped, and the another new locking range and the another old locking range are not overlapped at all.

9. A data storage device, comprising:
   a non-volatile (NV) memory, configured to store information, wherein the NV memory comprises at least one NV memory element; and
   a controller, coupled to the NV memory, configured to control operations of the data storage device, wherein the controller comprises:
      a processing circuit, configured to control the controller according to a plurality of host commands from a host device, to allow the host device to access the NV memory through the controller, wherein:
         in response to a request of changing an old locking range into a new locking range, the controller determines whether a start Logical Block Address (LBA) LBA of the new locking range is less than an end LBA of the old locking range, and determines whether an end LBA of the new locking range is greater than a start LBA of the old locking range; and
         in response to the start LBA of the new locking range being less than the end LBA of the old locking range and the end LBA of the new locking range being greater than the start LBA of the old locking range, the controller performs data trimming on any respective non-overlapped portions of the new locking range and the old locking range.

10. The data storage device of claim 9, wherein in response to a request of changing another old locking range into another new locking range, the controller determines whether a start LBA of the another new locking range is less than an end LBA of the another old locking range; in response to the start LBA of the another new locking range being less than the end LBA of the another old locking range, the controller determines whether an end LBA of the another new locking range is greater than a start LBA of the another old locking range; and in response to the end LBA of the another new locking range being not greater than the start LBA of the another old locking range, the controller performs data trimming on the another new locking range and the another old locking range, respectively.

11. The data storage device of claim 10, wherein in response to a request of changing yet another old locking range into yet another new locking range, the controller determines whether a start LBA of the yet another new locking range is less than an end LBA of the yet another old locking range; and in response to the start LBA of the yet another new locking range being not less than the end LBA of the yet another old locking range, the controller performs data trimming on the yet another new locking range and the yet another old locking range, respectively.

12. The data storage device of claim 11, wherein the old locking range and the new locking range have partial locking ranges that are overlapped, the another new locking range and the another old locking range are not overlapped at all, and the yet another new locking range and the yet another old locking range are not overlapped at all.

13. The data storage device of claim 10, wherein the old locking range and the new locking range have partial locking ranges that are overlapped, and the another new locking range and the another old locking range are not overlapped at all.

14. The data storage device of claim 9, wherein the old locking range and the new locking range have partial locking ranges that are overlapped.

15. The data storage device of claim 9, wherein in response to a request of changing another old locking range into another new locking range, the controller determines whether a start LBA of the another new locking range is less than an end LBA of the another old locking range; and in response to the start LBA of the another new locking range being not less than the end LBA of the another old locking range, the controller performs data trimming on the another new locking range and the another old locking range, respectively.

16. The data storage device of claim 15, wherein the old locking range and the new locking range have partial locking ranges that are overlapped, and the another new locking range and the another old locking range are not overlapped at all.

17. A controller of a data storage device, the data storage device comprising the controller and a non-volatile (NV) memory, the NV memory comprising at least one NV memory element, the controller comprising:
   a processing circuit, configured to control the controller according to a plurality of host commands from a host device, to allow the host device to access the NV memory through the controller, wherein:
      in response to a request of changing an old locking range into a new locking range, the controller determines whether a start Logical Block Address (LBA) of the new locking range is less than an end LBA of the old locking range, and determines whether an end LBA of the new locking range is greater than a start LBA of the old locking range; and
      in response to the start LBA of the new locking range being less than the end LBA of the old locking range and the end LBA of the new locking range being greater than the start LBA of the old locking range, the controller performs data trimming on any respective non-overlapped portions of the new locking range and the old locking range.

18. The controller of claim 17, wherein in response to a request of changing another old locking range into another new locking range, the controller determines whether a start LBA of the another new locking range is less than an end LBA of the another old locking range; in response to the start LBA of the another new locking range being less than the end LBA of the another old locking range, the controller determines whether an end LBA of the another new locking range is greater than a start LBA of the another old locking range; and in response to the end LBA of the another new locking range being not greater than the start LBA of the another old locking range, the controller performs data trimming on the another new locking range and the another old locking range, respectively.

19. The controller of claim 18, wherein in response to a request of changing yet another old locking range into yet another new locking range, the controller determines whether a start LBA of the yet another new locking range is less than an end LBA of the yet another old locking range; and in response to the start LBA of the yet another new locking range being not less than the end LBA of the yet another old locking range, the controller performs data trimming on the yet another new locking range and the yet another old locking range, respectively.

20. The controller of claim 19, wherein the old locking range and the new locking range have partial locking ranges that are overlapped, the another new locking range and the another old locking range are not overlapped at all, and the yet another new locking range and the yet another old locking range are not overlapped at all.

\* \* \* \* \*